United States Patent [19]

Barbe et al.

[11] Patent Number: 5,383,957
[45] Date of Patent: Jan. 24, 1995

[54] MULTISTAGE CASCADE SWEEP-PROCESS FOR MEMBRANE GAS SEPARATION

[75] Inventors: Christian Barbe; Dominique Masurel, both of Paris Cedex, France

[73] Assignee: L'Air Liquide, Paris Cedex, France

[21] Appl. No.: 70,041

[22] Filed: Jun. 1, 1993

Related U.S. Application Data

[60] Continuation of Ser. No. 964,259, Oct. 21, 1992, abandoned, which is a division of Ser. No. 725,773, Jul. 2, 1991, Pat. No. 5,240,471.

[51] Int. Cl.$^6$ ............... B01D 53/22; B01D 63/08
[52] U.S. Cl. ................... 96/8; 96/9; 96/14
[58] Field of Search ............ 55/16, 68, 158, 208, 55/267, 269; 95/43, 45, 54; 96/7–14

[56] References Cited

U.S. PATENT DOCUMENTS

| | | |
|---|---|---|
| Re. 33,678 | 9/1991 | Campbell et al. ............ 55/16 |
| 1,496,757 | 6/1924 | Lewis et al. ............ 55/16 |
| 2,617,493 | 11/1952 | Jones ............ 55/16 |
| 2,626,679 | 1/1953 | Harlow ............ 55/16 |
| 3,144,313 | 8/1964 | Pfefferle ............ 55/16 |
| 3,208,197 | 9/1965 | Simon et al. ............ 55/16 |
| 3,250,080 | 5/1966 | Garwin ............ 55/16 X |
| 3,339,341 | 9/1967 | Maxwell et al. ............ 55/16 |
| 3,442,002 | 5/1969 | Geary, Jr. et al. ............ 55/158 X |
| 3,735,558 | 5/1973 | Skarstrom et al. ............ 55/16 |
| 3,735,559 | 5/1973 | Salemme ............ 55/16 |
| 3,961,917 | 6/1976 | Benedict et al. ............ 55/16 |
| 4,104,037 | 8/1978 | Garrett et al. ............ 55/16 |
| 4,119,417 | 10/1978 | Heki et al. ............ 55/16 X |
| 4,140,499 | 2/1979 | Ozaki et al. ............ 55/16 X |
| 4,180,388 | 12/1979 | Graham et al. ............ 55/16 |
| 4,180,552 | 12/1979 | Graham et al. ............ 55/16 X |
| 4,478,719 | 10/1984 | Michele et al. ............ 55/16 X |
| 4,597,777 | 7/1986 | Graham ............ 55/16 |
| 4,718,921 | 1/1988 | Makino et al. ............ 55/16 |
| 4,873,835 | 10/1989 | Rojey et al. ............ 55/80 X |
| 4,894,068 | 1/1990 | Rice ............ 55/16 |
| 4,931,070 | 6/1990 | Prasad ............ 55/16 |
| 4,994,094 | 2/1991 | Behling et al. ............ 55/16 |

FOREIGN PATENT DOCUMENTS

| | | |
|---|---|---|
| 0430304 | 6/1991 | European Pat. Off. . |
| 0568443 | 10/1957 | Italy ............ 55/158 |
| 55-119420 | 9/1980 | Japan ............ 55/16 |
| 1-224028 | 9/1989 | Japan ............ 55/16 |

Primary Examiner—Robert Spitzer
Attorney, Agent, or Firm—Oblon, Spivak, McClelland, Maier & Neustadt

[57] ABSTRACT

A nitrogen generator for producing nitrogen gas from air having a plurality of stages of membrane units each containing a plurality of hollow fiber membranes having a feed input at least one of the plurality of membrane units containing a sweep input to inject a sweep gas longitudinally on the external surface of the hollow fiber membranes, the generator further containing:

a) a conduit for collecting a non-permeate stream of a membrane stage N and using the same as a feed stream for a membrane stage N+1;

b) a conduit for collecting only a permeate stream from at least the membrane stage N, and feeding all of the permeate stream from the membrane stage N to a sweep input of at least one previous membrane stage, such that the sweep gas is injected longitudinally and counter-current to the non-permeate gas on the external surface of the hollow fiber membranes, and that the sweep gas is mixed with the gas permeating through the hollow fiber membranes to make the permeate stream; and c) a conduit for collecting a permeate of a first membrane stage and a non-permeate of the last membrane stage.

10 Claims, 4 Drawing Sheets

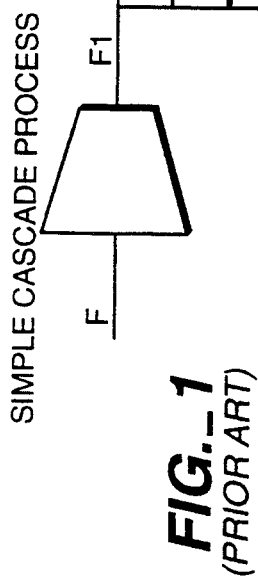
FIG._1
*(PRIOR ART)*
SIMPLE CASCADE PROCESS
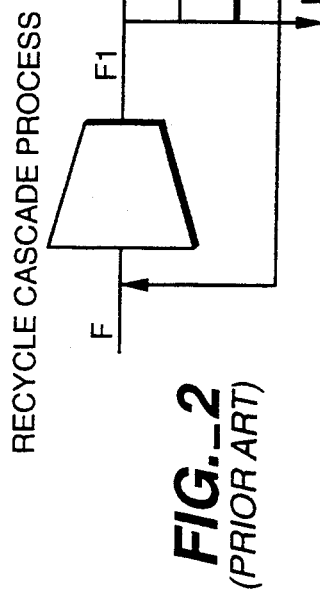
FIG._2
*(PRIOR ART)*
RECYCLE CASCADE PROCESS
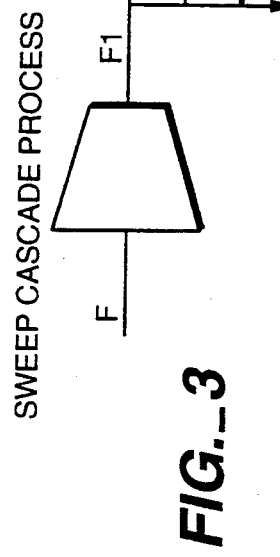
FIG._3
SWEEP CASCADE PROCESS

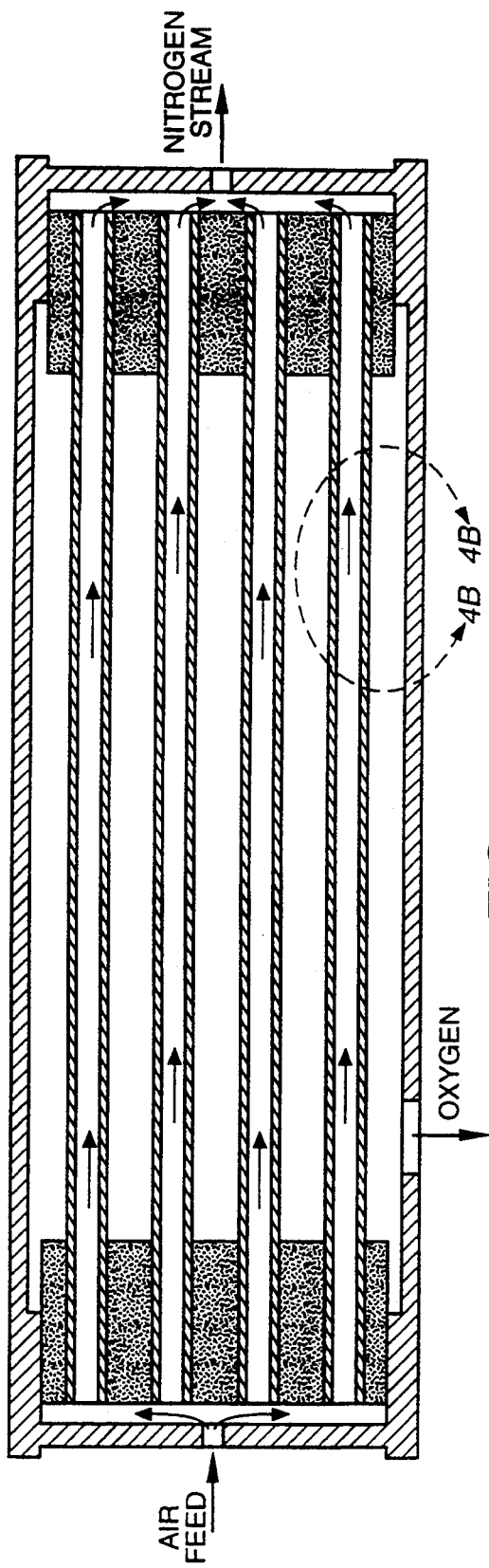
FIG._4A
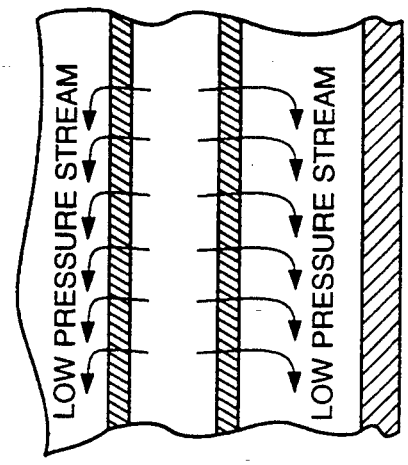
FIG._4B

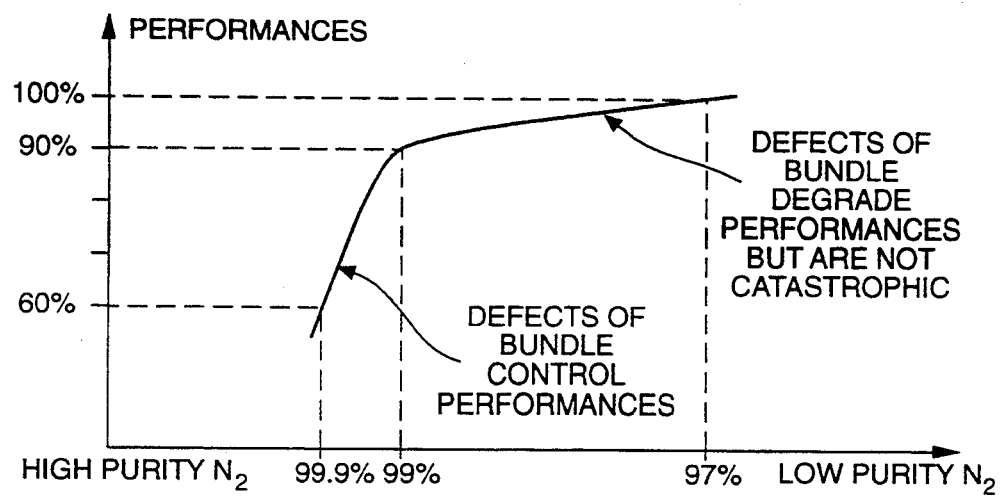
FIG._5
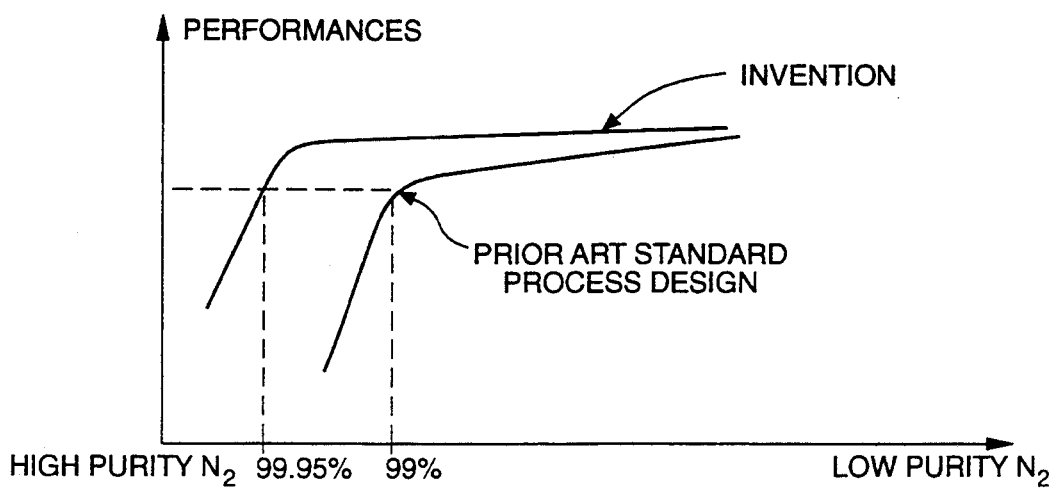
FIG._6

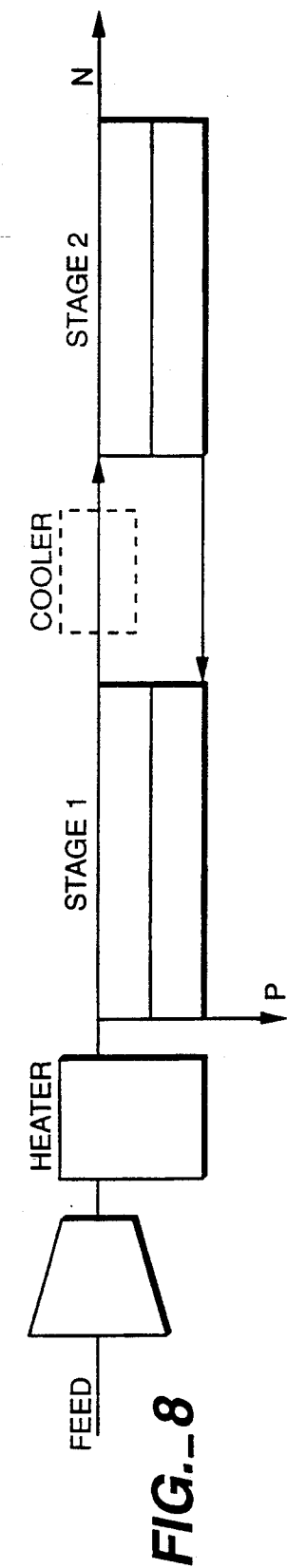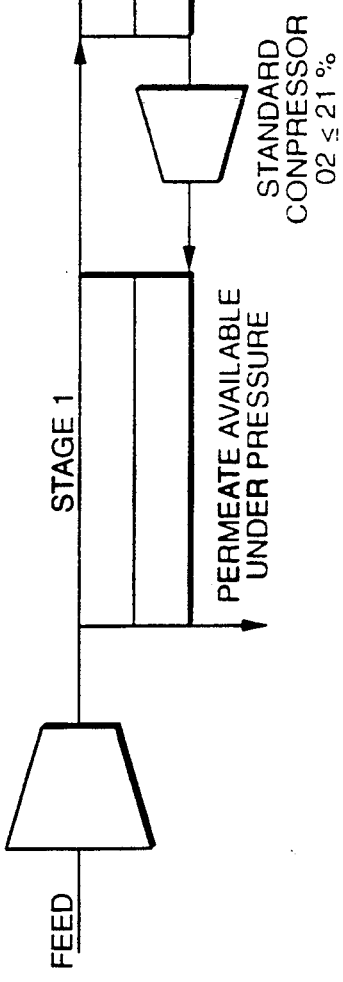
FIG._7
FIG._8
FIG._9

MULTISTAGE CASCADE SWEEP-PROCESS FOR MEMBRANE GAS SEPARATION

This application is a continuation of application Ser. No. 07/964,259, filed on Oct. 21, 1992, now abandoned, which was a divisional application of U.S. Ser. No. 07/725,773 filed Jul. 2, 1991, now U.S. Pat. No. 5,240,471.

BACKGROUND OF THE INVENTION

1. Field of the Invention

The present invention relates to permeable membrane systems for the production of high purity gases.

2. Description of the Background

Membrane processes are presently employed for a wide variety of gas separations. Generally, in these processes, a feed stream is brought into contact with the surface of the membrane, wherein the more readily permeable component, such as oxygen in the case of air separation, is recovered at low pressure whereas the less readily permeable component, such as nitrogen in the case of air feed, is collected as a non-permeate stream at a pressure close to feed pressure.

The membrane systems manufactured today are economically viable when providing a non-permeate stream which is enriched in one of the feed components in the low purity range. However, gases of higher purity are required on the market.

Added to that, in many cases, membranes exhibit small defects, such as microleaks or flow deviation from ideality because of manufacturing difficulties. Consequently, module performances are not as good as would be expected in the absence of such defects. Moreover, the deviation from ideal performance becomes greater when the produced gas purity increases, which makes high purity gas production at low cost difficult.

Conventional systems for the production of high purity gas, which satisfy market demand are either Pressure Swing Adsorption devices (PSA) or cryogenic devices or hybrid systems using both membranes and PSA, or membranes or PSA associated with a reactor, for example, where the oxygen residue in the nitrogen permeate (or non-permeate) is reacted with hydrogen to form water which must then be eliminated. However, such hybrid systems are complicated and costly and do not offer the simplicity of membrane systems.

In an effort to improve membrane systems, the use of two membrane units has been proposed.

For example, a simple cascade process has been proposed where the non-permeate stream of a first stage is employed as a feed stream of a second stage permeator. Such a system is illustrated in FIG. 1, and is disclosed in U.S. Pat. No. 4,894,068.

Also, a recycle cascade process has been proposed where the permeate flow of a second stage is mixed with a feed stream of a first stage before a compression step. Such a system is illustrated in FIG. 2, and is disclosed in U.S. Pat. Nos. 4,180,388; 4,180,552; and 4,119,417.

On the other hand, other multistage processes have been described in the literature for the recovery of a permeate stream, such as continuous column processes, stripper processes and parallel processes.

The simple cascade process of FIG. 1 does not take advantage of the permeate stream of the second stage when this gas is enriched in less readily permeating gas when compared to the feed air or with the first stage permeate stream. As applied to the production of high purity nitrogen, as in U.S. Pat. No. 4,894,068, the simple cascade process is economically limited to only the small capacities of laboratory scale due to high energy consumption.

The recycle cascade process uses the permeate stream by mixing it with the feed stream before compression at high energy cost, and increased complexity.

Hence, a need continues to exist for a membrane process for the production of a high purity non-permeate stream which reduces the required investment and expenditure of energy. In particular, a need continues to exist for such a process for the production of high purity nitrogen on a large scale.

SUMMARY OF THE INVENTION

Accordingly, it is an object of the present invention to provide a membrane process for the production of high purity gases.

It is also an object of the present invention to produce a membrane process for the production of high purity gases which requires a reduced investment and expenditure of energy for operation.

It is furthermore, a particular object of the present invention to provide a membrane process for the production of high purity nitrogen, such as 99% or higher purity, preferably, collected as non-permeate from the last stage of a membrane cascade system.

Accordingly, the above objects and others which will become apparent in view of the following disclosure are provided by a process for the production of gases and particularly high purity gases using two or more membranes in combination, which entails:

a) collecting a non-permeate stream of a stage N and using the same as a feed stream for a stage N+1, b) collecting a permeate stream of said stage N+1 and feeding the same to a permeate stream of a stage N, and c) collecting a permeate of a first stage and a non-permeate of a last stage.

BRIEF DESCRIPTION OF THE DRAWINGS

FIG. 1 illustrates a conventional simple cascade process where a non-permeate stream of a first stage is the feed stream of a second stage permeator.

FIG. 2 illustrates a conventional recycle cascade process where the permeate flow of a second stage is mixed with a feed stream of a first stage before a compression step.

FIG. 3 illustrates the membrane system of the present invention where the permeate stream is fed to a permeate of a first stage membrane unit in a sweep countercurrent process so as to take advantage of the enriched gas without expending energy to recompress the same.

FIG. 4(a) illustrates the use of the present membrane in separating nitrogen and oxygen.

FIG. 4(b) illustrates the passage of a low pressure stream across a typical hollow fiber bundle.

FIG. 5 illustrates in graphic form the performance or recovery of a membrane as a function of nitrogen purity for a conventional system.

FIG. 6 illustrates in graphic form a comparison of the present membrane system and a conventional system for the performance or recovery of a membrane as a function of nitrogen purity.

FIG. 7 illustrates the use of low performance bundles for a first stage, and high performance bundles for a second stage in accordance with the present invention.

FIG. 8 illustrates the use of differential stage temperatures in accordance with the present invention.

FIG. 9 illustrates the use of a compressor on the permeate side between second and first stages in accordance with the present invention.

DETAILED DESCRIPTION OF THE PREFERRED EMBODIMENTS

The present invention provides a multistage membrane system wherein a permeate stream is fed to a permeate of a first stage membrane unit in a sweep counter-current process so as to use the enriched gas advantageously so as to avoid the expenditure of energy to recompress the same. The present invention is quite advantageous in the production of a high purity non-permeate stream as both investment and energy cost are reduced. The present invention is particularly advantageous in the production of high purity nitrogen on large scale.

Membrane systems are capable of selectively permeating a more readily permeable component from a feed gas mixture containing the same and a less readily permeating gas. Membranes for effecting this result may be of any type of chemical composition known by the artisan, such as polyimides, polyamides, polycarbonates, polysiloxanes, polyolefins, polysulfones and cellulose acetate, or inorganic membranes, such as ceramic, glass or carbon, for example, and are commonly arranged in symmetric or asymmetric or composite hollow fibers or in spiral wound bundles.

Moreover, different types of bundles and module configurations have been developed where the permeate and non-permeate streams may have concurrent, countercurrent or cross-flow patterns or a combination thereof. However, whatever intrinsic membrane characteristics are used, the complete countercurrent flow pattern is the theoretical optimum flow pattern while membrane performance is generally affected by any deviation from such a flow pattern, such deviation has all the more effect on membrane performance when high purity gas products are produced.

However, in practice it is extremely difficult to impose such an ideal flow pattern both on the permeate side and on the non-permeate side of the membrane. In the case of hollow fibers, the flow pattern outside the fiber will very often differ significantly from ideality, particularly if the low pressure permeate side is outside the fiber.

As a consequence, at the product end of the bundle where the permeate flow is minimum, it is very likely that longitudinal mixing will occur meaning that an ideal countercurrent flow pattern will not be observed in this area. This phenomena has been well described particularly in an article by A. G Narinsky, "Applicability Conditions of Idealized Flow Models for Gas Separation by Asymmetric Membranes", *Journal of Membrane Science*, 55, 1991, pp. 333-347).

Regardless of the flow pattern used, high purity performances of a membrane module very often can be limited by the ability of present manufacturing technologies in assembling tens to hundreds of thousands of hollow fibers without any leaks or breakage. Macroscopically, the performance e.g., recovery, for a membrane module can be graphically depicted in FIG. 5.

In general, the present invention entails using several membrane units in combination, including combination in parallel with the cascade system itself, in order to take advantage of all streams produced by each unit to enhance the performance of the others in a countercurrent flow pattern mode while also limiting the consequences of any defects of any bundles. In accordance with the present invention, the units size and chemical composition can be identical or different.

The proposed process is, in general, a multistage process entailing two or more membrane units, where the non-permeate stream of the stage N is collected and used as the feed stream of the stage N+1, the permeate stream of stage N+1 is collected and fed to the permeate stream of the stage N, preferably in a counter-current sweep way, and the permeate of the first stage and the non-permeate of the last stage are collected.

That is, the present invention is generally practiced with two or more membrane units in combination, by 1) collecting a non-permeate stream of a stage designated N and using this collected stream as a feed stream of a stage N+1, i.e., a subsequent stage; 2) collecting a permeate stream of stage N+1 and feeding the same to a permeate stream of a stage N, i.e., a preceding stage, preferably in a countercurrent sweep manner; and 3) collecting the permeate of the first stage and the non-permeate of the last stage.

According to various embodiments of the present invention, the non-permeate stream of stage N can be used as a feed stream for stage N+1 and/or N+2, etc., bearing in mind that there is usually, in practice, a small pressure drop between stage N, stage N+1 and stage N+2, etc. This means that the pressure on the non-permeate or feed side of stage N is greater than the pressure on the feed side of any subsequent stage, such as stage N+1 or stage N+2.

On the contrary, the permeate of stage N, which sweeps the permeate side of stage N−1 can be used to sweep stage N−1 and/or N−2, etc. This means that the permeate of stage N always has a pressure which is greater than the pressure of at least one of the permeates of stages 1 to N−1 in order to be able to sweep the permeate side of the membrane. This also means that the pressure drop through stage N between the non-permeate and the permeate is greater than that of stage N+1.

The use of a serial system with a sweep stream on the permeate coming from the next stage permeate results in an increase in performances as compared to the performances of N similar separators operated in parallel or in series without sweep or recycle, or compared to the performances of one larger separator having a membrane surface area comparable to the sum of the areas of the N smaller separators. By collecting and homogenizing the permeate flow at stage N+1 and using it as a sweep gas for stage N, any defects, such as non-ideal flow pattern or microleaks, for example, on bundle N+1 will have a much smaller effect than in the case of non-cascade process or a cascade process without permeate sweep.

In accordance with the present invention, it has been discovered that the present cascade-sweep multistage system provides a surprising improvement over a single stage and other multistage systems both with respect to energy consumption and membrane area required. For example, the simple cascade system, affords a lower energy consumption at the cost of a higher area being required to satisfy a given demand, as compared to the simple parallel system. Also, the cascade-recycle process affords both area and energy savings. However, the present cascade-sweep system requires much less area than all other systems. Further, in using the present cascade-sweep system, energy consumption is also advantageously lowered.

In accordance with the present invention, the high purity gas produced is preferably nitrogen, and the feed stream may be either atmospheric air or mixtures of oxygen and nitrogen, however, it is preferably atmospheric air which is fed to the first stage.

The membranes may be arranged in any form, such as symmetric hollow fibers, asymmetric hollow fibers or spiral wound bundles.

Additionally, the various stage membranes may be advantageously of different performance bundles. For example the first stage membrane may be made of low performance bundles and the last stage membrane may be made of high performance bundles. Further, each stage may be operated at a temperature different from the others. For example, the first stage membrane may be operated at a higher temperature than another stage membrane, such as the last stage membrane.

In accordance with the present invention, the permeate stream from at least one stage membrane may be compressed prior to feeding the same to at least one preceding stage.

The present invention also provides a cascade-sweep process for the production of a gas from a gas mixture using two membranes in combination, which entails:
a) feeding a gas mixture to the feed side of a first membrane,
b) collecting a non-permeate stream of the first membrane and passing the non-permeate stream to a second membrane as a feed stream,
c) collecting a permeate stream from the second membrane and feeding the same to a permeate stream from the first membrane, and
d) collecting the permeate stream from the first membrane and the non-permeate stream of the second membrane.

In accordance with this process, the gas produced is preferably nitrogen, and the feed gas mixture is preferably atmospheric air or a mixture of oxygen and nitrogen.

Further, it is advantageous to feed the permeate stream of the second membrane to the permeate stream from the first membrane by counter-current sweep. It is also advantageous if the permeate of the second membrane has a pressure which is higher than the pressure of the permeate of the first membrane. It is, moreover, also advantageous if the first membrane has a pressure drop which is higher than the pressure drop through the second membrane.

In general, the present invention also provides a cascade-sweep process, wherein m membranes are used in combination, and wherein at least one permeate stream at stage n, wherein $1 < n \leq m$ is fed to at least one permeate stream at stage p, wherein $1 < p < n.$ The present invention also provides a nitrogen generator, having two or more membranes in combination, which contains:
a) means for collecting a non-permeate stream of a stage N and using the same as a feed stream for a stage N+1,
b) means for collecting a permeate stream of the stage N+1 and feeding the same to a permeate stream of a stage N by counter-current sweep, and
c) means for collecting a permeate of a first stage and a non-permeate of a last stage.

The nitrogen generator is advantageously used by feeding a mixture of oxygen and nitrogen to the first membrane, and recovering or venting an oxygen-enriched gas mixture on the permeate side of the first membrane and recovering nitrogen on the feed side of the last membrane.

The nitrogen generator also may advantageously contain heating means in order to heat at least one membrane stage, and/or cooling means in order to cool at least one membrane stage.

Generally, two or more membrane steps are used in accordance with the present invention. Most commonly two or three membrane stages are used. However, more than three membrane stages may be used, if desired.

Furthermore, the permeate of the first stage and the non-permeate of the last stage are recovered or collected as product gases.

Although the present invention may be advantageously used to separate nitrogen from atmospheric air or mixtures of oxygen and nitrogen, the present invention is applicable to any type of gas mixture with adapted membranes, i.e., with a membrane which is more permeable to one species than the other.

The Figures provided will now be described in more detail. FIGS. 1, 2 and 3 have already been described above.

In FIGS. 1–3, the following abbreviations and their respective definitions are used: F=feed, F1=feed 1, F2=feed 2, N=non-permeate, P=permeate, R=recycle and S=sweep. P1 and P2 refer to permeates from first and second membranes, respectively.

FIG. 4 illustrates the ideal counter-current flow pattern in a hollow fiber bundle. This figure shows air feed providing a nitrogen stream as permeate, and an oxygen stream as non-permeate.

In this figure, air feed is shown with separation of nitrogen and oxygen using a membrane.

FIG. 5 illustrates the performance or recovery of a membrane as a function of nitrogen purity for a conventional membrane system. In particular, in the case of nitrogen FIG. 5 shows that for high purity gases, bundle defects control membrane performance. However, for gases of lower purity, bundle defects degrade membrane performance, but are not fatal.

FIG. 6 illustrates a comparison of the present membrane system and a conventional membrane system for the performance or recovery of a membrane as a function of nitrogen purity. In particular, FIG. 6 shows that in using a conventional standard process design, bundle defects control membrane performance even at only moderately high gas purities. However, in using the present invention; bundle defects control membrane performance only at higher gas purities. That is, by using the present invention, degradation of membrane performance is initially observed only at higher gas purities, and then less dramatically.

FIG. 7 illustrates the use, in accordance with the present invention, of both low average and high average performance bundles while maintaining optimum performances.

In accordance with the present invention, more bundles may be deemed acceptable than before. This may be accomplished by using low performance bundles for a first stage and high performance bundles for a second stage. This affords both maximum bundle usage and excellent overall performance.

As used herein, the term "low performance bundle" generally means more than 10% off from standard specification of productivity and/or air flow. The term "high performance bundle" generally means less than 10% off from standard specification of productivity and/or air flow.

FIG. 8 illustrates the use of differential stage temperatures in accordance with the present invention. As a rule, for most polymer membranes, selectivity decreases with temperature while productivity increases.

In accordance with the present invention, by differentiating the operating temperature of first stage and second stage, such as a heater on the first stage or a cooler on the second stage, it is possible to benefit from both and to obtain overall optimal performance. The temperature of each stage may be varied to achieve optimal performance, however, for cascade processes, it is generally desirable for the final stage to operate at the highest possible selectivity, while the first stage the highest possible productivity is important. As a rule, for most polymer membranes, selectivity decreases with temperature while productivity increases.

Generally, the present invention may be operated advantageously in a temperature range of from −20° C. to 90° C., however, preferably from +20° C. to 60° C. More particularly, however, it is more preferred if the first stage membrane is operated at about +40° C. to −60° C., and the last stage membrane is operated at about +20° C. to −40° C. In general, it is preferable to operate stage N between the preferred range of stage N−1 and N+1.

Furthermore, in order to ensure the highest possible selectivity for the final stage, it is generally advantageous to operate the final stage of from +20° C. to 60° C.

It is more preferred, however, to utilize the following conditions:

|  | First Stage | N Stage | Last Stage |
|---|---|---|---|
| Selectivity $O_2/N_2$ | 4–6 | 4.5–7 | 5–8 |
| Productivity | 200–400 | 100–300 | 50–100 |

Generally, for the production of nitrogen, the present invention is operable without flow rate limits. However, it is preferred if a flow rate of from about 0.2 m³/h to 2,000 m³/h is used.

FIG. 9 illustrates that the use of a compressor on the permeate side between first and second stages in accordance with the present invention affords at least two advantages.

First, as the permeate contains less than 21% oxygen, a standard compressor (air compressor) may be used instead of an oxygen compressor, which is far more expensive, when the oxygen concentration of the gas mixture is greater than 21%.

Second, by operating with a permeate at atmospheric pressure, the performance of the second stage of the membrane is not reduced. This is particularly important if a high purity non-permeate stream, such as nitrogen, is simultaneously required.

The above features are very advantageous. For example, for conventional air separation it is necessary either to recompress the permeate stream if it is at atmospheric pressure, which requires special expensive compressors because the oxygen content is higher than 21%, or the entire permeate stream must be maintained at above atmospheric pressure, which very significantly reduces the entire membrane performance particularly for the production of the non-permeate, such as nitrogen.

Macroscopically, the benefit of the present invention can be represented and seen from the graph illustrated in FIG. 6.

The present invention will now be further illustrated by reference to certain examples which are provided solely for purposes of illustration and are not intended to be limitative.

EXAMPLE 1

In the following example, separation of nitrogen from air using a polyimide membrane is considered. The membrane system is designed to produce 100 Nm³/h of 98% pure nitrogen. The bundle imperfections are represented by a decrease in the apparent selectivity of the fiber as purity increases. The bundles are arranged in parallel or using one of the previously described multistage systems or using the cascade-sweep process of the present invention.

All systems have been studied and the cascade-sweep multistage system provides a surprising improvement over a single stage system and other multistaged systems, both in terms of energy consumption or in terms of membrane area required (Table 1). These advantages are illustrated below.

|  | Parallel | Simple Cascade | Recycle Cascade | Sweep Cascade |
|---|---|---|---|---|
| Area | 100 | 103.5 | 94.4 | 91.4 |
| Energy | 100 | 97.6 | 88.8 | 89.9 |

The simple cascade system, when compared to the simple parallel system, offers the advantage of a lower energy consumption at a price of a higher area required to satisfy a given demand (+3.5% area, −2.4% energy savings). The cascade-recycle process allows for both area savings (−5.6%) and energy savings (−11.2%).

As seen in the Table, the present cascade-sweep system requires much less area than all other systems (−8.6% for the cascade-sweep process versus −5.6% for the recycle cascade). Further, the energy consumption is also lower than the simple cascade process and equivalent to the recycle cascade.

This example illustrates that the present cascade-sweep process affords savings in both area and energy to a much greater extent than the previously described systems.

EXAMPLE 2

Permeation bundle reproducibility is often a major difficulty. For any particular polymer, if high specifications for the final product are set out, there may be high rates of off spec. bundles. The present invention enables more bundles to be considered as acceptable, with an evident manufacturing cost benefit, while still maintaining optimum performances. Indeed, by using low performance bundles for a first stage with the present process and high performance bundles for a second stage, a high overall performance and maximum usage of manufactured bundles is obtained. This is illustrated in FIG. 7.

EXAMPLE 3

For most polymers, selectivity decreases with temperature while productivity increases. In a cascade process, it is fundamental for the final stage to operate at the highest possible selectivity while for the first stage productivity is usually more determinant.

Therefore, with the present invention by differentiating the operating temperature of the two stages, such as a heater on the first stage or a cooler on the second stage, one can benefit from both and obtain global optimum performances.

EXAMPLE 4

In certain applications, it may be desirable to use both permeate and non-permeate products. The problem usually, in the case of air separation, is generally that either it is necessary to recompress the permeate stream if it is at atmospheric pressure, which requires special expensive compressors because the $O_2$ content is higher than 21%, or the whole permeate stream is maintained at above atmospheric pressure which reduces very significantly the performances of the whole membrane particularly for the production of the non-permeate, such as nitrogen.

Furthermore, by including a compressor on the permeate side between the two stages, the present invention offers at least two advantages.

As the oxygen content in the permeate stream between the two stages is lower than 21%, a standard compressor can be used to recompress the same. Also, by operating with a permeate at atmospheric pressure, the performance of the second stage is not compromised. The latter advantage is particularly important where a high purity non-permeate stream, such as nitrogen, is simultaneously required.

Having described the present invention it will be apparent to one of ordinary skill in the art that many changes and modifications may be made to the above-described embodiments without departing from the spirit and the scope of the present invention.

What is claimed as new and desired to be secured by Letters Patent of the United States is:

1. A nitrogen generator for producing nitrogen gas from a feed stream of atmospheric air or a mixture of nitrogen and oxygen, said generator having at least first and second stages of membrane units each containing a plurality of hollow fiber membranes and having feed input means, at least one of the membrane units comprising a sweep input to inject a sweep gas longitudinally on the external surface of the hollow fiber membranes, the generator further comprising:

a) means for feeding said feed stream to a first membrane stage;
    b) means for collecting a non-permeate stream of said first membrane stage and using the same as a feed stream for a second membrane stage;
    c) means for collecting only a permeate stream from at least said second membrane stage, and feeding all of the permeate stream from said second membrane stage to a sweep input of at least said first membrane stage, such that the sweep gas is injected longitudinally and countercurrent to the non-permeate gas on the external surface of the hollow fiber membranes, and that the sweep gas is mixed with gas permeating through the hollow fiber membranes to make the permeate stream; and
    d) means for collecting a permeate of said first membrane stage and a non-permeate of said second membrane stage or for collecting a permeate of said first membrane stage and a non-permeate of a last membrane stage, when more than said first and second membrane stages are used.

2. The nitrogen generator of claim 1, which is capable of feeding said atmospheric air of said mixture of oxygen and nitrogen to said first membrane stage, recovering or venting an oxygen-enriched gas mixture on the permeate side of said first membrane stage and recovering nitrogen on the feed side of the last membrane stage.

3. The nitrogen generator of claim 1, further comprising heating means on at least one membrane stage.

4. The nitrogen generator of claim 1, further comprising cooling means on at least one membrane stage.

5. The nitrogen generator of claim 1, wherein more than two membrane stages are used, whereby at least one permeate stream of one membrane stage can be fed to at least one sweep input of a previous membrane stage.

6. The membrane generator of claim 1, wherein at least one membrane stage of said plurality of membranes is made of a polymer which is different from a polymer of another of said plurality of membrane stages.

7. The membrane generator of claim 1, wherein at least said last membrane stage comprises a membrane having a selectivity for nitrogen which is greater than that of at least one previous membrane stage, said previous membrane stage comprising a membrane having a productivity for nitrogen which is greater than that of said last membrane stage.

8. The membrane generator of claim 1, wherein the membranes are made of a material selected from the group consisting of polyimides, polyamides, polycarbonates, polysiloxanes, polyolefins, polysulfones, cellulose acetate, ceramic, glass and carbon.

9. The membrane generator of claim 1 wherein said membranes are arranged in a form of symmetric hollow fibers, asymmetric hollow fibers or spiral wound bundles.

10. The membrane generator of claim 1, wherein the first and last membrane stages each comprise bundles, the bundles of said last membrane stage having a higher performance of nitrogen production than said bundles of said first membrane stage.

* * * * *

UNITED STATES PATENT AND TRADEMARK OFFICE
CERTIFICATE OF CORRECTION

PATENT NO. : 5,383,957
DATED : January 24, 1995
INVENTOR(S) : Christian Barbe, et. al.

It is certified that error appears in the above-indentified patent and that said Letters Patent is hereby corrected as shown below:

Column 5, line 57, "$1<n\leq m$" should read -- $1<N\leq m$ --.

Column 5, line 61, "$1<p<n$" should read -- $1<p<N$ --.

Signed and Sealed this

Twenty-sixth Day of November 1996

Attest:

BRUCE LEHMAN

*Attesting Officer*     *Commissioner of Patents and Trademarks*